SWITCHING SYSTEM

INVENTOR.
WALTER F. SCHUCHARD
CARL A. P. JOHNSON
BY
EZEKIEL WOLF
HIS ATTORNEY

INVENTOR.
WALTER F. SCHUCHARD
CARL A. P. JOHNSON
BY
EZEKIEL WOLF
HIS ATTORNEY.

Feb. 4, 1958 W. F. SCHUCHARD ET AL 2,822,435

SWITCHING SYSTEM

Filed March 25, 1955 3 Sheets-Sheet 3

INVENTOR
WALTER F. SCHUCHARD
CARL A. P. JOHNSON
BY
EZEKIEL WOLF
HIS ATTORNEY

United States Patent Office 2,822,435
Patented Feb. 4, 1958

2,822,435

SWITCHING SYSTEM

Walter F. Schuchard, Hingham, and Carl A. P. Johnson, Quincy, Mass., assignors to S. H. Couch Company, Inc., North Quincy, Mass., a corporation of Massachusetts Application March 25, 1955, Serial No. 496,692

9 Claims. (Cl. 200—16)

The present invention relates to a switch and switching system particularly for automatic telephone circuits such as are used in hospitals, apartment houses, inter-office communications and for other similar purposes.

The present switching system including the switch and the circuits connected therewith is particularly adaptable for automatic audio visual nurse calling systems used for communications between patients and communication centers in hospitals and is particularly designed to improve the facilities for easy communications between patients and nurses or other central stations.

The present system provides a switch which may be used as a room station, as a bath station or as any other station in the system. The switch of the present invention is provided with a multiple group of contacts which are operated by a pull chain arrangement which sets the switch mechanism in one of two positions. The mechanism after it is operated may be reset manually or by an electro magnet operated from the central or other station to restore the switch to its normal open position.

The arrangement of the switching element is compact, contained within a small housing and is definitely operated in two positions by a moveable element which moves from one set of connections to another set of connections in a positive operation.

The merits and advantages of the present invention will be more fully set forth in the specification below in connection with the drawings illustrating parts thereof in which.

Figure 1:
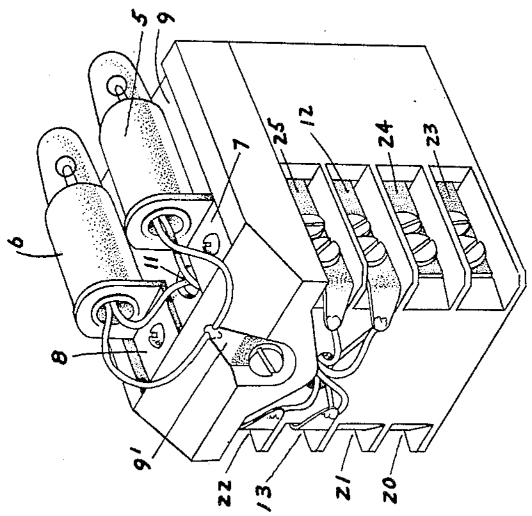
Figure 1 shows the switch of the present invention with the face plate removed looking from the rear thereof forward.
Figure 2:
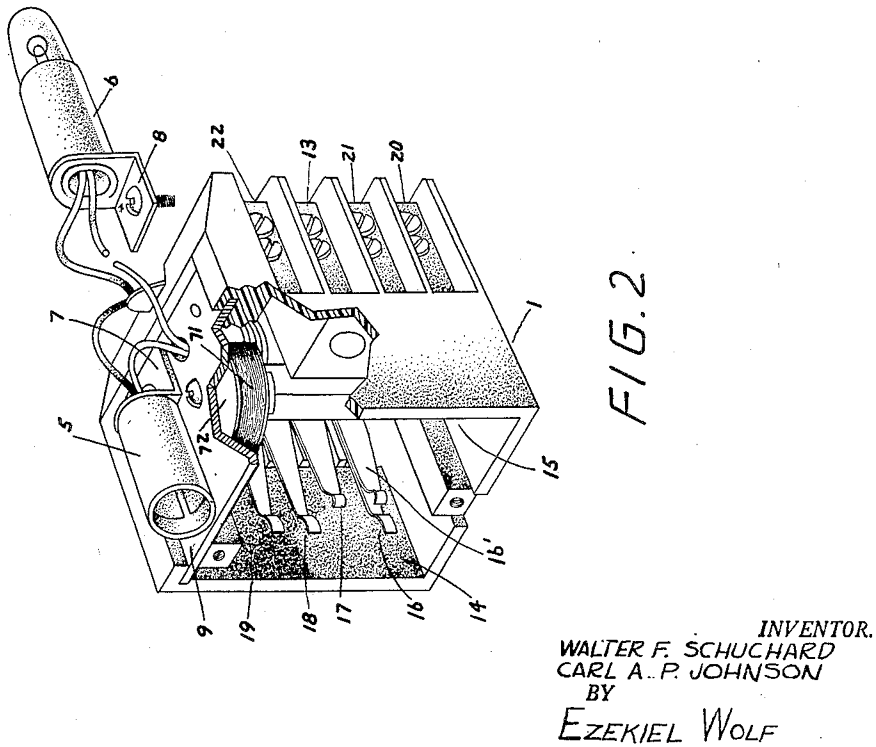
Figure 2 shows the switch housing looking into the housing where face plate has been removed.
Figure 3:
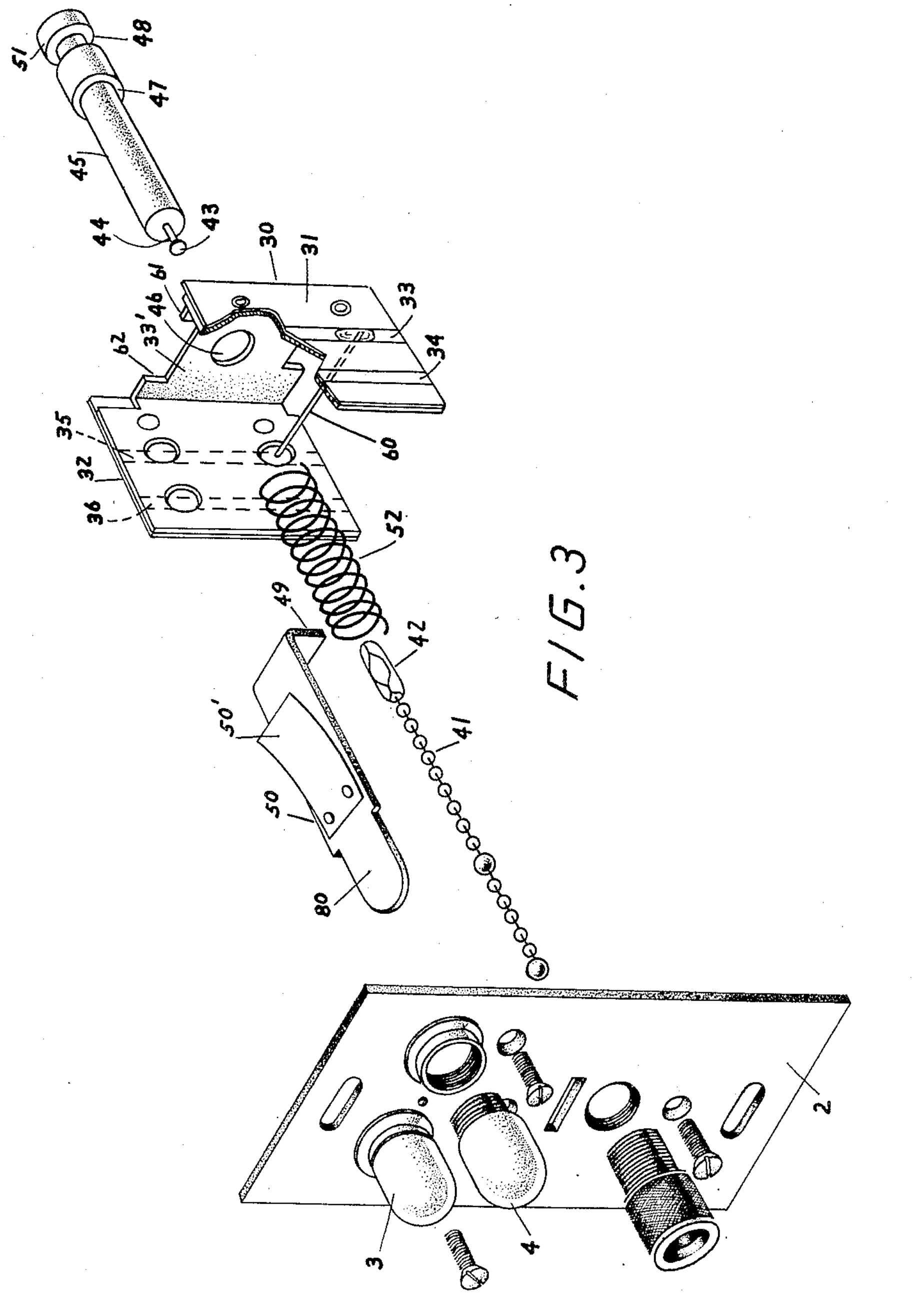
Figure 3 shows an exploded view in perspective looking from the forward portion of the face plate rearward including the elements of the switch but omitting the casing thereof.

As indicated in Figures 1, 2, and 3 the switch of the present invention comprises a housing or casing 1 which at its forward end is covered by a panel or plate 2 (Figure 3) which may contain one or two light indicators 3 and 4 mounted in sockets 5 and 6 respectively (Figure 2), which are secured by brackets 7 and 8 to a top plate 9 of the housing or casing 1.

One set of leads from the sockets 6 and 7 is brought to a common conductor or terminal 9', while the other set of leads are brought through a hole 11 in the plate 9 through respectively to the terminals, to the terminal connections 12 on one side of the casing 1 and 13 on the other side of the casing 1.

Figure 4:
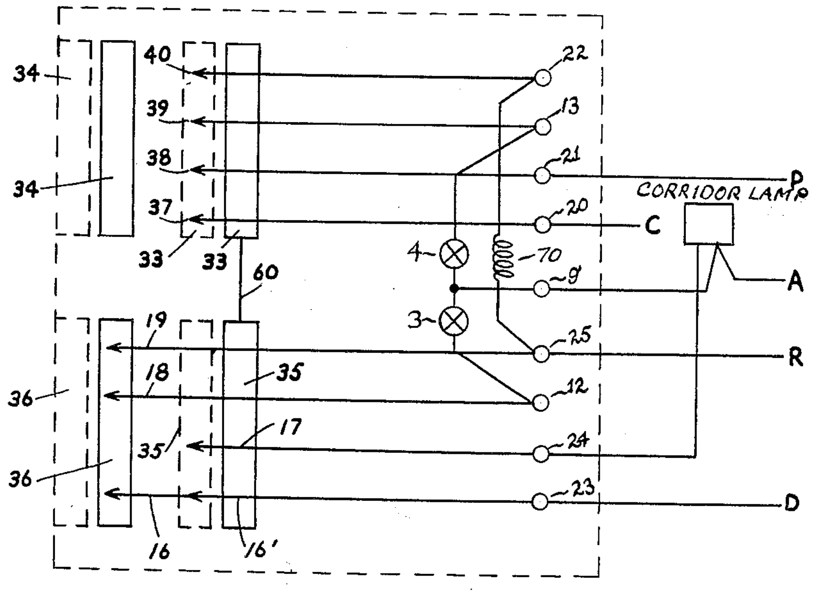
Figure 4 shows a wiring diagram for a room station employing the switch described in Figures 1 to 3, and, Figure 5 shows a wiring diagram including a room station and bath station using the switch for the present invention as an element thereof.

The housing or casing 1 has on the inside of opposite side walls 14 and 15, a plurality of switch fingers or contact elements 16, 17, 18 and 19 which may be seen in Figure 2, on the side 14 and a similar number of four switch fingers on the side 15, which are not visible in Figure 2 but which correspond to the external connectors 20, 21, 13 and 22 as seen in Figure 1. The switch finger 16 is conductively connected to and held by the connection terminal 23, the finger 17 by the connection terminal 24, the finger 19 by the connection terminal 25. A second finger 16' shorter than the finger 16 is also connected with the conductive terminal 23. The elements 12, 23, 24, 25 as well as 20, 21, 13 and 22 are terminals for connecting external leads to the fixed contact elements which are adapted for connection to the movable contact members of the switch comprising the substantial U shaped elements 30 (Figure 3) which comprises two side plates 31 and 32 joined by a cross supporting piece 33'. This U shaped member has on the outside of the plates or sides 31 and 32 two spaced conductive strips 33 and 34 on the outside of the plate 31, 35 and 36 on the outside of the plate 32. These conductive strips are in such a position that in one position of the switch they engage the longer contact fingers and in the other position of the U-shaped element they engage the shorter of the contact fingers. The contact fingers or elements connected to the conductive terminals 20, 21, 13 and 22 on one side of the housing may have the shorter contact fingers as shown at 37, 38, 39 and 40 (Figure 4), while the contact fingers 16, 18 and 19 on the other side of the housing may be longer to cooperate with the contact strip 36 with a second set of shorter contact fingers comprise the contact 16' and 17 which are seen in Figure 2 on the inside of the casing 1 and as indicated in Figure 4, will cooperate with the contact strip 35 for making the desired electrical connections.

The U-shaped piece mentioned above fits within the housing 1 with the plate 32 bearing against the contacts 16, 16', 17, 18 and 19 and with the plate 31 bearing against the contact elements on the other side of the casing 1 lying against the inner wall 15 not shown in the drawing in Figure 2. The contacts are, however, shown schematically in Figure 4 of the wiring diagram wherein the contacts 16, 16', 17, 18 and 19 correspond to the same numbered contacts on the wall 14 of the inside of the casing 1. The contact members 37, 38, 39 and 40 shown in the wiring diagram of Figure 4 correspond to four sets of contact elements on the wall 15 of the shell or housing 1 connected to the switch connections 20, 21, 13, and 22. Contact strips 33 and 34 are mounted on the outside of the plates 31 and contact strips 35 and 36 are mounted on the outside of the plate 32. The contact strip 34 of Figure 4 corresponds to the same numbered contact strips 34 of Figure 3, while the contact strips 36 of Figure 4 and 35 correspond to the same numbered contacts of Figure 3. The U-shaped contact switch member 30 is moved towards the face of the housing as shown in Figure 2 by the operation of the pull chain 41 and released to permit a spring to return the mechanism as will be described presently.

The pull chain 41 has a key 42 at the end which engages the head 43 of the pin 44 secured in the guide shaft 45 which passes through the hole 46 in the plates 33' of the U-shaped switch operating element 30.

The external wall of the end member 33' of the U-shaped member rests against a shoulder 47 on the shaft 45 and beyond this shoulder there is a reduced section 48 providing an angular recess in which the end 49 of the latch element 50 will engage when the end 49 is lined up with the recess. A spring plate 50' holds the end 49 in the recess. The end of the shaft 45 has an enlarged annular section 51 between which end and the shoulder 47 the controlling latch is engaged as just stated. A coiled spring 52 surrounds the shaft 45 which projects into the U-shaped member between the side walls 31 and 32 and the front end of this spring bears against the rear of the plate 2, while the rear end of the spring 52 bears against the inner end of the cross plates 33' of the U-shaped member. The conducting strips 33 and 35 are preferably connected together by a cross conducting wire 60 but the strips 34 and 36 are preferably left independent of one another corresponding to the diagram shown in Figure 4. The latch member 50 passes over the top edge of the member 33' between two side flanges 61 and 62 with the right angled end 49 facing inward and engaging in the recess 48 when the U-shaped member 30 has been pulled forward to its foremost position by pulling the socket chain 41.

In the operation of the switch mechanism shown in the drawing, the position indicated in the full line of Figure 4 is the inoperative usual position. When the pull cord 41 is pulled, and the U-shaped member is moved to the left in a position indicated in Figure 4, the contact strip 33 is drawn to the dotted line position 33 and the contact strip 34 to the dotted line position 34. In the same manner the contact strips 35 and 36 are drawn to the dotted line positions 35 and 36. Under these conditions, the circuits may be traced as follows:

In the dotted line position all the connection terminals 22, 13, 21 and 20 ending in the contact fingers or elements 40, 39, 38, and 37 bear on the contact strip 33, while the contact strip 35 make connections with the contact fingers or elements 16' and 17 connected to the terminals 23 and 24 respectively. In this operative position, the circuit through the white light (Figure 4) is completed over the terminal 13, the contact finger 39, the contact strip 33, the contact finger 37, the terminal 20 and back through the ground circuits (A) and the terminal 9' on the switch. The common wire P connected to the terminal 21 and the contact finger 38 are similarly energized through the power terminal 20, and the contact 37 through the plate 33.

The connection for the release coil 70 is completed through the contact terminal 22, the contact finger 40, the contact strip 33 and the power line through the contact finger 37 and the terminal 20 over the line C returning through the line connection R to the terminal 25. The terminal 20 is connected to a reset switch at the central station which when operated energizes the coil 70 to raise up the armature or plate 50 which is of magnetic material to the magnet coil 71 on the magnet 72 (see Figure 2) so that the coil spring 52 will push the U-shaped contact switch plate 33 to the right as viewed in Figure 3 to restore the switch to an initial position.

In the deenergized or initial position of the switch the connecting light 3 is energized through the connecting terminal 12 of the switch, the contact 18, the plate 36, the contact 16 to the terminal 23 which is connected back through to the lamp terminal on a central control equipment over the line D. In the operative position, the contact finger 17 is also connected to the plate 35 and therefore lights up the corridor lights through the terminal 24 and through the ground connections 9'. The connection from the contact finger 17 is completed to the power terminal over the cross connecting wire 60 to the cross connecting strip or plate 33, which as explained before connects with the common line at the terminal 20. In the operation of the switch all that the patient need do is to pull the pull cord 41 which moves the U-shaped contact plate having the strip 33, 34, 35 and 36 outward making terminal connections for the contact strip 33 and 35 with the contact elements 16', 17, 37, 38, 39 and 40. This will operate the call light and also operate as desired a visual and oral indication in the central control station or the nurse's room where ever the connections are to be made.

When the nurse comes into any of the patient's rooms she may reset the switch manually to its initial position by pressing the tongue elements 80 of the bar magnet 50 in which case the edge of the panel through which the bar passes acts as the point of fulcrum of a lever to raise the angle end section 49 of the member 50 out of engagement with the recess 48 on the shaft 45. The switch will then move to the position shown by the full lines in Figure 4 in which case the call light will be put out and the switch connection will be shown as on and the other operating elements at the nurse's station on the central control board will also be restored.

In addition to the manual operation at the patient's room the switch may also be restored by a button which will energize the coil 70 which electric button may be in the central control system and/or at the nurse's station so that when the coil 70 is energized, the plate 50 will be drawn up to disengage the end 49 from the recess 48.

Figure 5:
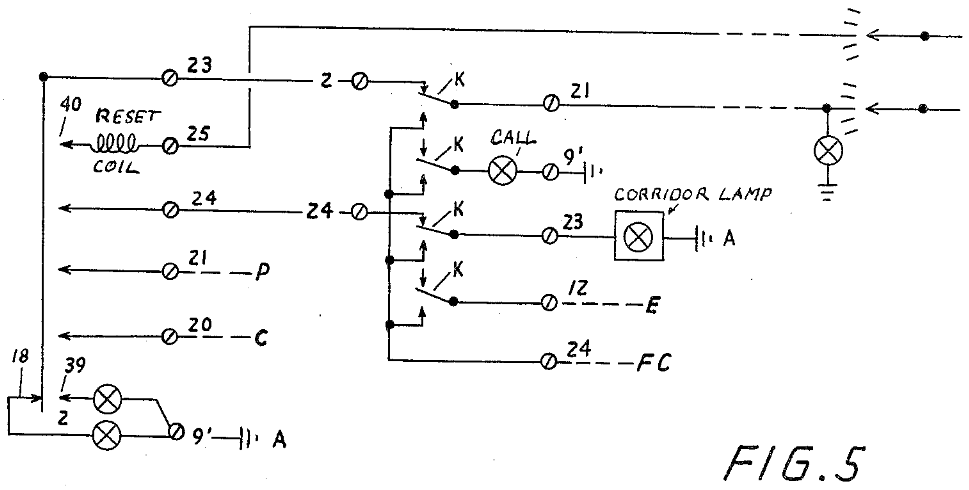

The circuit in Figure 4 shows the switching for a room station which in Figure 5 the connections are shown for typical room and bath wiring connections the numbers 21, 23, and 24 in bath room and bath station switches corresponding to the same connections in the switch.

On inspection of the bath station switch positions it will be seen that the upper positions of the switch arms labelled K which may correspond to the elements 33 and 35 in the full line position in Figure 4 that the topmost line, labelled lamp line, is connected to the terminal 23 of Figure 4, which connects through contact 16 to contact 18 through the terminal connection 12 and the green connection light 3 to the ground 9'. All other contacts are open.

When the pull chain is pulled at the bath stations, the contacts K of Figure 5 go into the downward position and the white call light 4 is operated, the corridor lamp, so labelled and the other connecting lines labelled E, FC and lamp wire.

While the wiring diagrams of Figures 4 and 5 shows a particular wiring arrangement it will be understood that this arrangement may be varied to control different electrical means such as additional signal lights and other audio and visual circuits, all by the switch mechanism and circuits which have been described.

Having now described our invention, we claim:

1. A switching circuit of the type discribed comprising a housing having conductive contact elements spaced on the inside opposite walls thereof forming contacts in one side of the switching circuit, a U-shaped shell having a plurality of contact strips on the outer sides of the shell adapted to cooperate with said conductive contact elements to complete electrical circuits therewith, spring means positioned to act between the cross member of the U and the housing to bias the U in a first position wherein the strips engage a number of the contact elements, means for moving said U-shaped shell in the direction of the extension of the sides of the shell to a second position against said spring for effecting a change of electrical connections between the contact elements and the contact strips, a latching device automatically locking said shell in its second position, and means for releasing the latching device for permitting the spring to return the shell to its first position.

2. A switching circuit of the type described comprising a housing having conductive contact elements spaced on the inside opposite walls thereof forming contacts in one side of the switching circuit, a U-shaped shell having contact strips on its outer sides adapted to cooperate with said conductive contact elements to complete electrical circuits therewith, spring means positioned to act between the cross member of the shell and the housing to bias the shell in a first position wherein the strips engage a number of said contact elements, means for moving said U-shaped shell in the direction of the extension of the sides of the shell and against said spring to a second position for effecting a change of electrical connections between the contact elements and the contact strips, means for locking said U-shaped shell in its second position, manually operated means for releasing the locking means permitting the spring to return the U-shaped shell to its initial position, and means including a circuit closed when the shell is in its second position for releasing the locking means.

3. A switching circuit of the type described comprising a housing having a plurality of conductive contact elements mounted on the inside of a pair of opposite walls thereof forming contacts in one side of the switching circuit, a U-shaped shell mounted in said housing and having arms parallel to said opposite walls, contact strips on the outer sides of the arms adapted to cooperate with said conductive contact elements to complete electrical circuits therewith, a stud element fitting in one end of said housing and bearing against said shell with an end extending through the cross member of said shell, a coiled spring wound about the stud between the cross member of said shell and the other end of said housing, means for axially moving said stud causing the U-shaped shell to move in the direction of its arms against said spring for effecting a change of electrical connections between the contact elements and the contact strips, means for locking said stud in its moved positions, and means for releasing the locking means permitting the spring to return the U-shaped shell to its initial position.

4. A switching circuit of the type described comprising a housing having an open face at one side, a face plate adapted to be secured over the open face of the housing, a U-shaped shell having the open end of the U facing the face and positioned to be moved within the housing towards and away from the face, switching contacts mounted on the inside walls of the housing opposite the side elements of the U-shaped shell, contact strips mounted on the outer surface of the side elements of the U adapted to be engaged by said contacts of said housing, a pull chain extending through said face plate and having means attaching it to said U-shaped shell, spring means acting between said U-shaped shell and said face plate in opposition to the linear motion of said pull chain, latching means comprising a stud having an annular recess and extending through the cross member of the U-shaped shell, a bar having an angled end adapted to engage said recess for holding the U-shaped shell against the action of the spring, said bar extending through said face plate and adapted to be actuated externally thereof for releasing the U-shaped shell.

5. A switching circuit of the type described comprising a housing having an open face at one side, a face plate adapted to be secured over the open face of the housing, a U-shaped shell having the open end of the U facing the face and positioned to be moved within the housing towards and away from the face, switching contacts mounted on the inside walls of the housing opposite the side elements of the U-shaped shell, contact strips mounted on the outer surface of each of the side elements of the U adapted to be engaged by said contacts of said housing, a pull chain extending through said face plate and having means attaching it to said U-shaped shell, spring means acting between said U-shaped shell and said face plate in opposition to the linear motion of said pull chain, latching means comprising a stud having an annular recess acting through the cross member of the U-shaped shell, a bar having an angled end adapted to engage said recess for holding the U-shaped shell against the action of the spring, said bar extending through said face plate and adapted to be actuated externally thereof for removing the angled end from the recess, and means electrically operated remotely for removing the angled end from the recess.

6. A switching circuit of the type described comprising a housing having an open face at one side, a face plate adapted to be secured over the open face of the housing, a U-shaped shell having the open end of the U facing the face and positioned to be moved within the housing towards and away from the face, switching contacts mounted on the inside walls of the housing opposite the side elements of the U-shaped shell, contact strips mounted on the outer surface of the side elements of the U adapted to be engaged by said contacts of said housing, a pull chain extending through said face plate and having means attaching it to said U-shaped shell, spring means acting between said U-shaped shell and said face plate in opposition to the linear motion of said pull chain, latching means comprising a stud having an annular recess and extending through the cross member of the U-shaped shell, a bar having an angled end adapted to engage said recess for holding the U-shaped shell against the action of the spring means, said bar extending through said face plate and adapted to be actuated externally thereof to remove the angled end from the recess to release the U-shaped shell, an electromagnet mounted in said housing adjacent the bar for removing the angled end from the recess when the electromagnet is energized, and means including a circuit closed when the shell is moved against the action of the spring means for energizing said electromagnet.

7. A device of the class described in claim 3 further characterized by said locking means comprising a recess on said stud, a latch having an arm extending towards said stud, and means urging said arm into said recess when the shell is moved against the bias of the spring.

8. A device of the class described in claim 7 further characterized by a means including an electrical circuit closed when the shell is moved against the bias of the spring for lifting said arm out of said recess, permitting the spring to restore the shell to its initial position.

9. A switching circuit of the type described comprising a housing having conductive contact elements spaced on the inside walls thereof forming contacts in one side of the switching circuit, means disposed within the housing and having a plurality of contact strips on its outer side adapted to cooperate with the conductive contact elements to complete electrical circuits therewith, spring means acting between the last-named means and the housing biasing the last-named means to a first position wherein the strips engage a number of the contact elements, means for moving said last-named means to a second position within the housing against the action of the spring means for effecting a change of electrical connections between the contact elements and the contact strips, a latching device automatically locking the last-named means in the second position, and means for releasing the latching device for permitting the spring means to return the said last-named means to its first position.

References Cited in the file of this patent

UNITED STATES PATENTS

| | | |
|---|---|---|
| 376,072 | Cole | Jan. 10, 1888 |
| 1,105,485 | Carlson | July 28, 1914 |
| 1,549,211 | Palevich | Aug. 11, 1925 |
| 1,674,052 | McLaughlin | June 19, 1928 |
| 2,112,054 | Thumin | Mar. 22, 1938 |
| 2,373,889 | Harmon | Apr. 17, 1945 |
| 2,385,292 | Logan | Sept. 18, 1945 |
| 2,520,681 | Hanson | Aug. 29, 1950 |
| 2,523,215 | Irvine | Sept. 19, 1950 |
| 2,575,147 | Unsworth | Nov. 13, 1951 |

FOREIGN PATENTS

| | | |
|---|---|---|
| 654,470 | France | Nov. 29, 1928 |
| 657,673 | Germany | Mar. 10, 1938 |